United States Patent [19]

Rausch

[11] Patent Number: 5,423,517
[45] Date of Patent: Jun. 13, 1995

[54] TECHNIQUE FOR PULLING WIRE THROUGH A CONDUIT

[76] Inventor: James E. Rausch, P.O. Box 143, Hoven, S. Dak. 57450

[21] Appl. No.: 68,799

[22] Filed: Jun. 1, 1993

[51] Int. Cl.$^6$ ............................................. B65H 59/00
[52] U.S. Cl. ............................................. 254/134.3 FT
[58] Field of Search ............ 254/134.3 FT, 134.3 R; 81/418, 419, 423, 300; 15/104.31, 104.33, 143 R; 294/3, 113, 114, 1.1

[56] References Cited

U.S. PATENT DOCUMENTS

| | | | |
|---|---|---|---|
| 2,736,532 | 2/1956 | Hughes | 254/134.3 FT |
| 3,302,929 | 2/1967 | Danielson et al. | 254/134.3 R |
| 4,746,099 | 5/1988 | Lopes | 254/134.3 FT |
| 5,022,633 | 6/1991 | Lopes | 254/134.3 FT |

Primary Examiner—Robert C. Watson
Attorney, Agent, or Firm—John R. Ley; John B. Phillips; John R. Ley

[57] ABSTRACT

A hand tool firmly grips an electrician's fish tape and allows an electrician to use both hands to pull the tape in an ergonomically correct manner. The fish tape is gripped between opposing jaws attached to the inner ends of pivotably connected handles. The handles are substantially parallel to one another when the fish tape is gripped between the jaws, thus allowing the electrician to pull equally on the two handles in a balanced manner when pulling wire. At the conclusion of a pulling stroke, the handles are pivoted to an open position to release the grip on the fish tape. A closed channel, formed when the handles are pivoted to the open position, maintains the fish tape in contact with the hand tool as the handles are pushed forward along the fish tape in preparation for the next pulling stroke. Upon reaching the starting point of the next pulling stroke, the handles are pivoted from the open position to the substantially parallel position to again grip the fish tape.

13 Claims, 4 Drawing Sheets

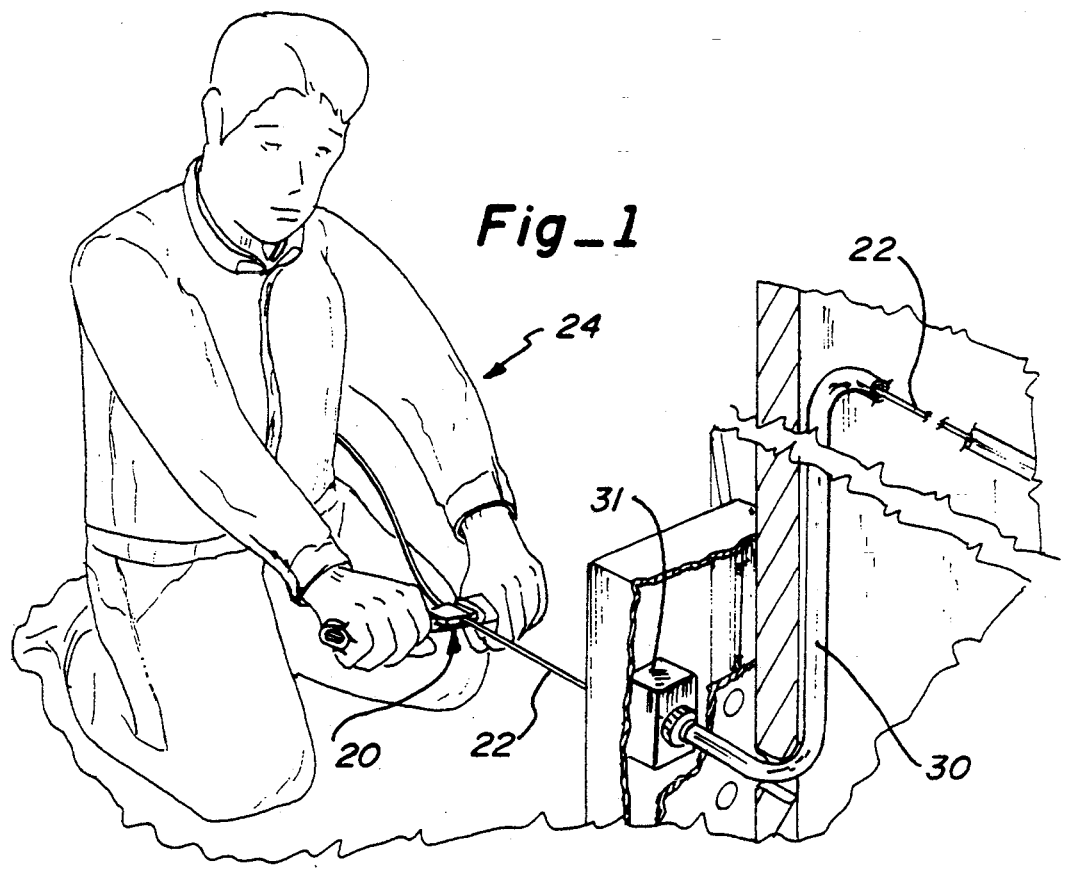
Fig_1
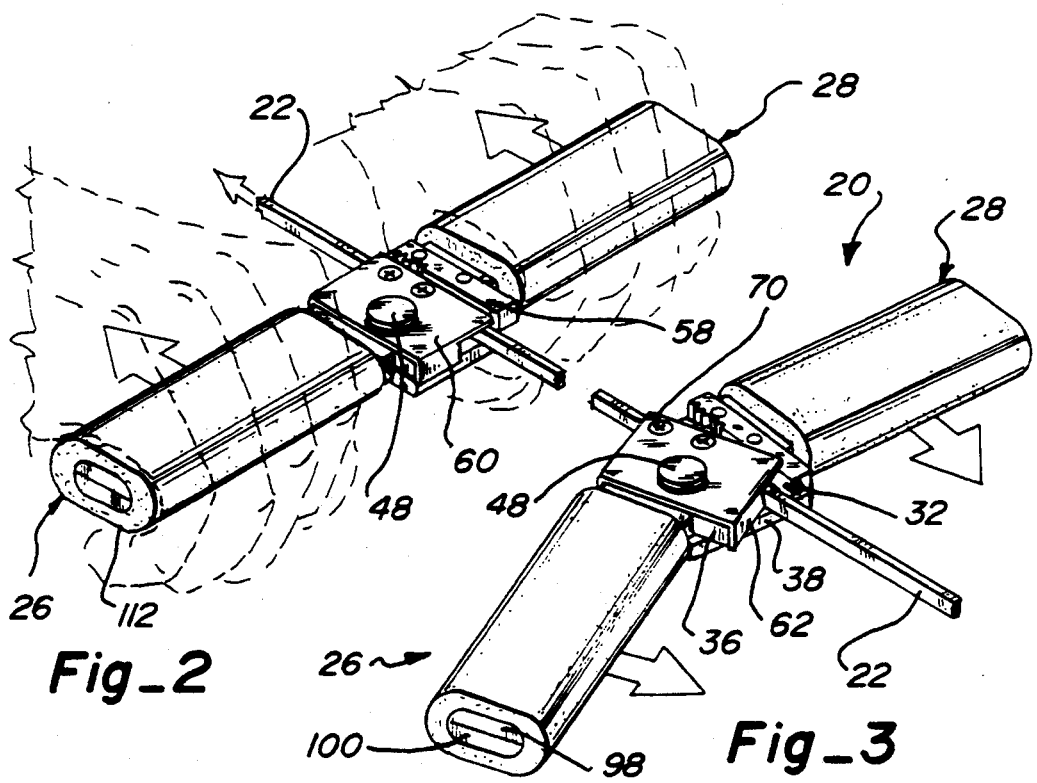
Fig_2  Fig_3

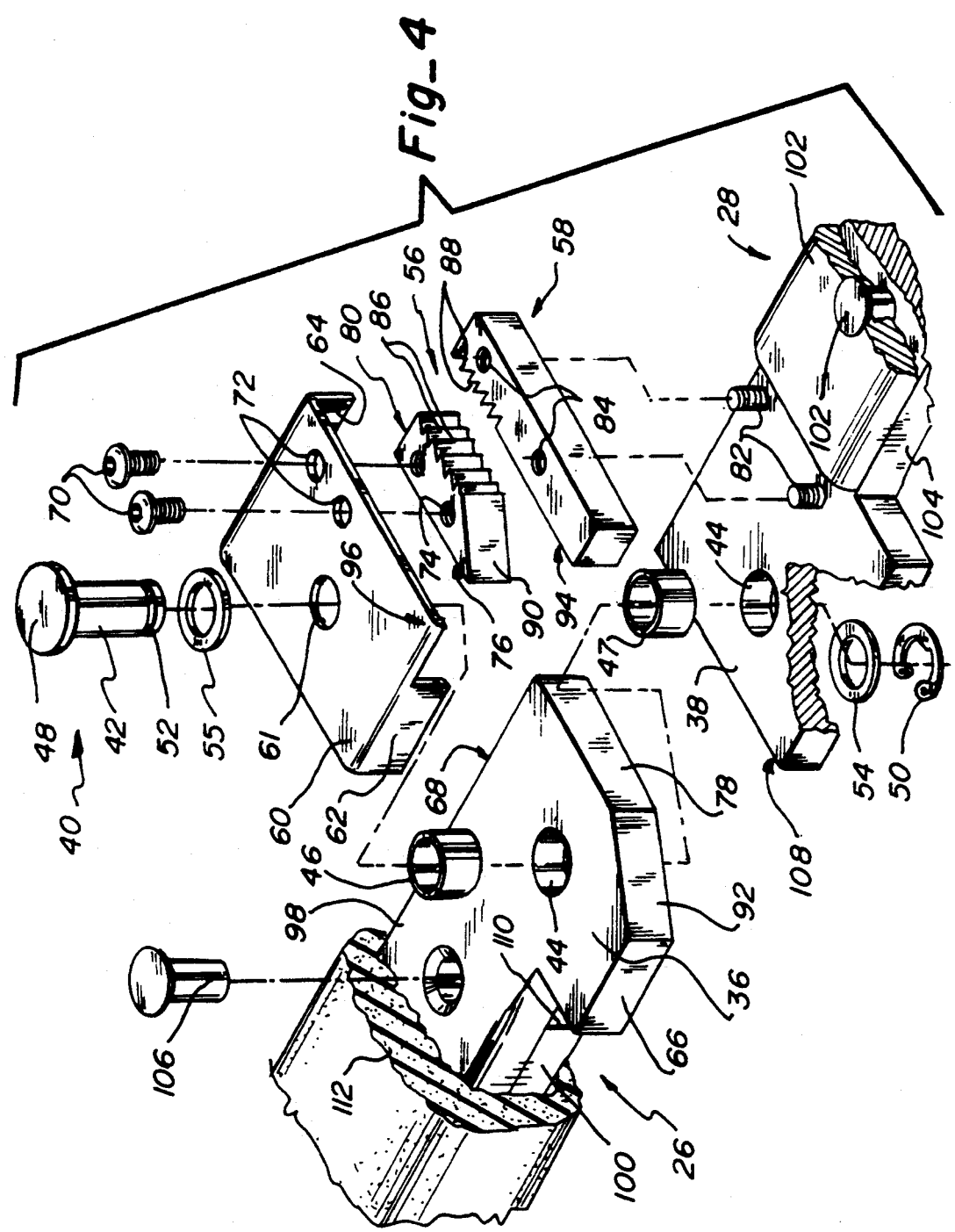

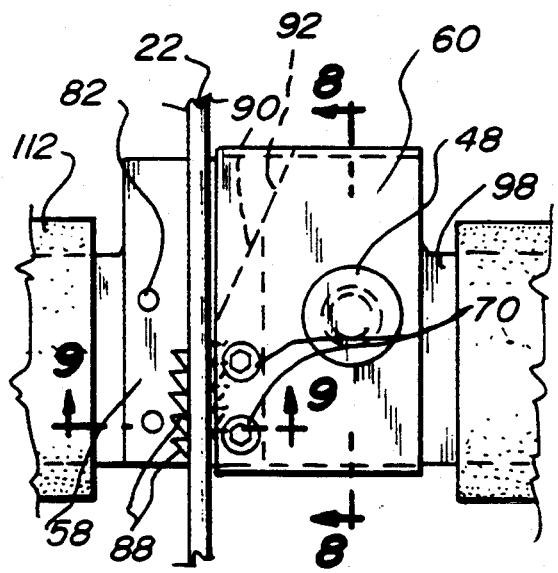
Fig_5
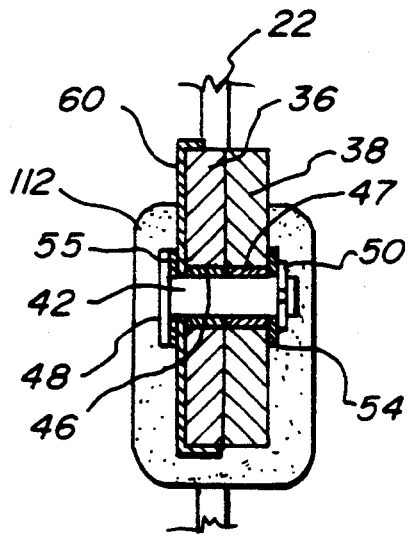
Fig_8
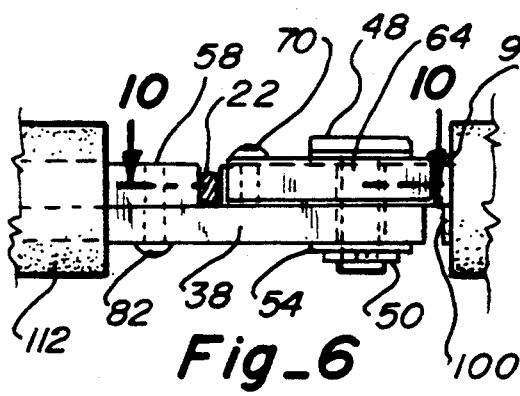
Fig_6
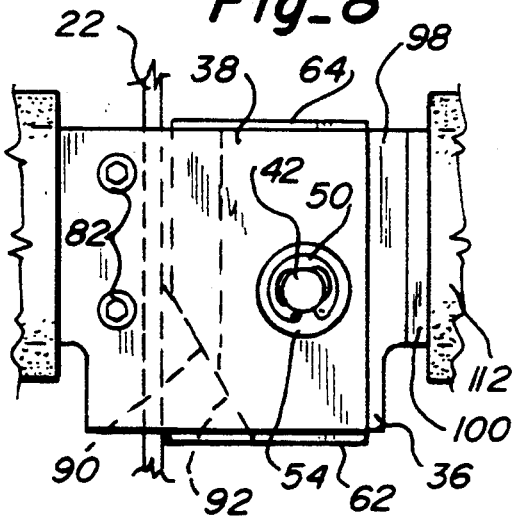
Fig_7
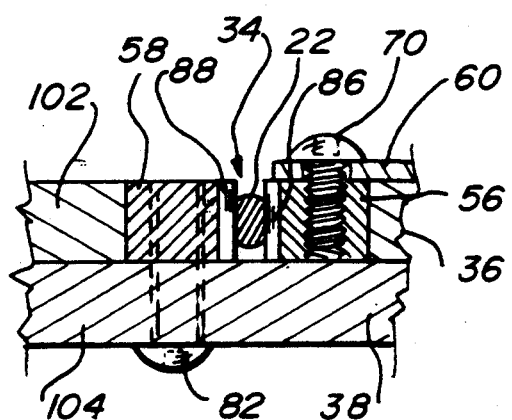
Fig_9
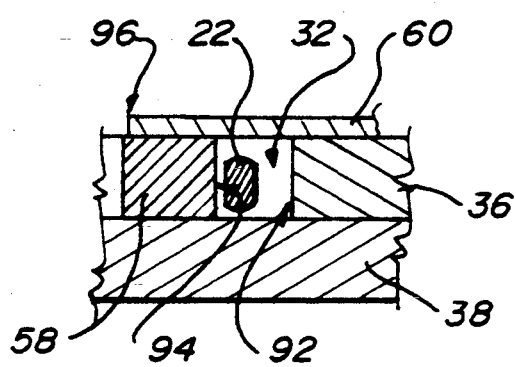
Fig_12

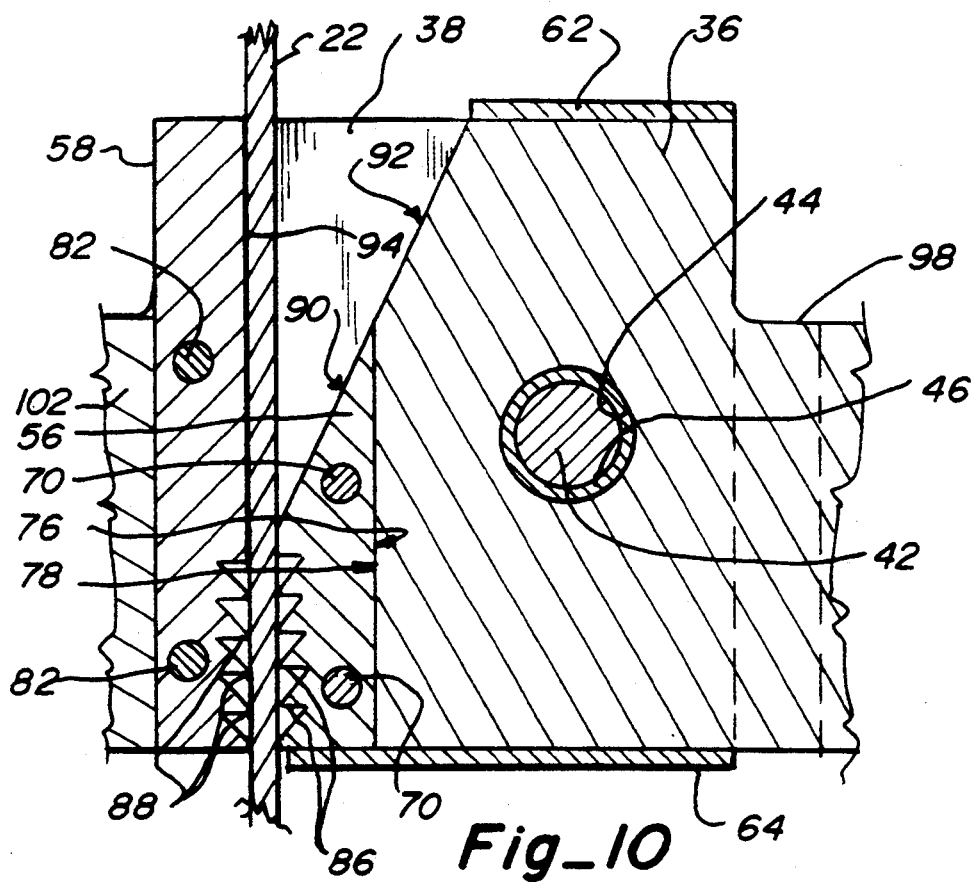
Fig_10
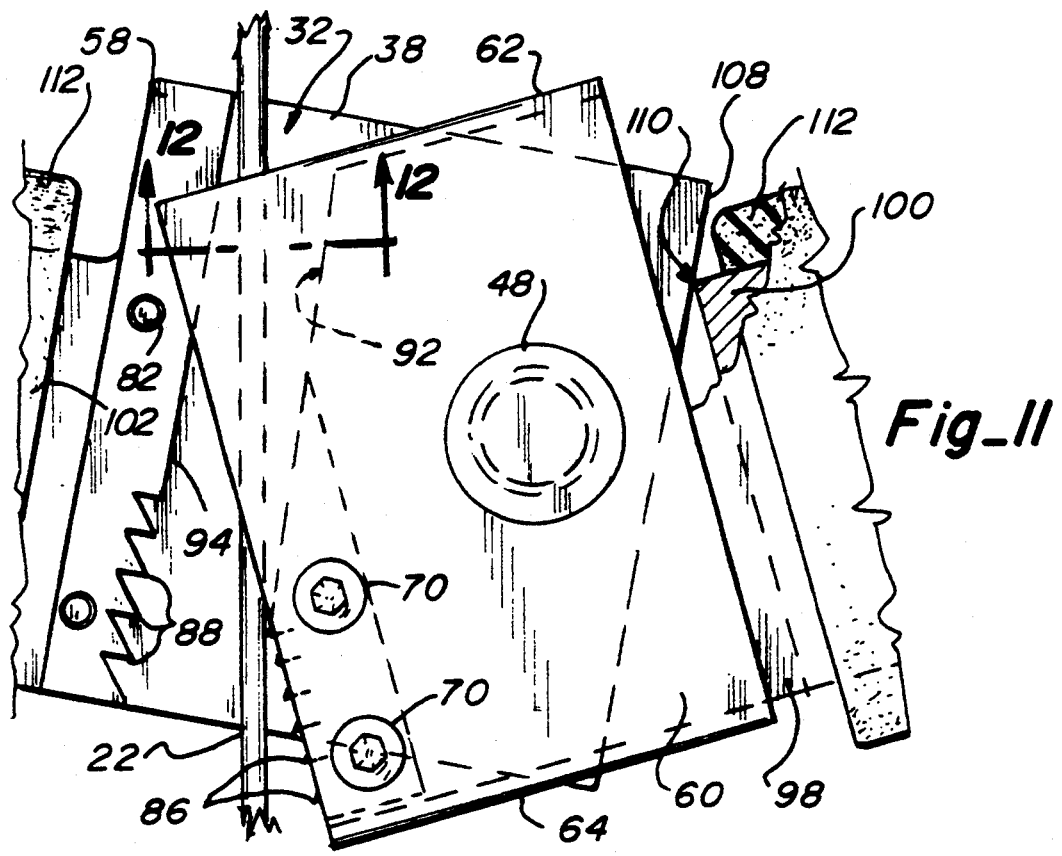
Fig_11

TECHNIQUE FOR PULLING WIRE THROUGH A CONDUIT

This invention relates to pulling electrical wires through conduits and pipes, and more particularly, to a methodology and a tool for gripping fish tape to pull the electrical wires through conduits and pipes.

BACKGROUND OF THE INVENTION

Electricians are routinely required to pull wires through lengthy conduits or pipes. It is not uncommon for such conduits to stretch many feet in length and contain a number of elbows and turns which increase the difficulty of pulling wires through the conduits.

The typical technique for pulling wires through a conduit entails initially pushing a length of resilient spring steel fish tape through the conduit. The fish tape has a substantially rectangular cross section which, in combination with its spring steel construction, allows it to bend around corners within the conduit while maintaining sufficient rigidity to be pushed a considerable distance. A flexible leader with a rounded tip is attached to a free end of the fish tape. The leader enhances the ability to negotiate corners as the fish tape is pushed through the conduit. After the leader reaches the terminal end of the conduit, the electrical wires are attached to the leader. The fish tape and attached wires are then pulled back through the conduit until the leader and the end of the electrical wires exit the end of the conduit into which the leader was initially pushed.

When pulling the wire, one person pulls the fish tape from the one end of the conduit while a second person feeds the electrical wires into the other end of the conduit. The fish tape and the wires are pushed and pulled in increments or strokes of several feet at a time. The two people at opposite ends of the conduit develop a rhythm which allows them to pull and feed wire at the same time, and this rhythm enhances the speed and ease by which the wire is pulled.

The fish tape is reusable so care must be taken not to damage the tape while pushing and pulling it through the conduits. Although the fish tape is sometimes guided by hand, it is difficult to adequately grip the tape when pushing long distances or when pulling a large number of electrical wires, due to the heavy force required to maneuver the tape and the attached wires through the conduit. To gain additional force, a hand tool such as a pair of pliers is typically used to grip the fish tape. Pliers are frequently used due to the ready availability of pliers within the electrician's tool belt or toolbox. However, the jaws of conventional pliers are typically harder than the spring steel fish tape and hence must be used carefully to keep from damaging the reusable fish tape.

Additionally, pliers are inconvenient and inefficient for lengthy wire pulls due to the large number of individual pulling strokes required. With each stroke, the electrician must release the jaws of the pliers from the tape and then firmly regrip the tape at a point several feet further away. Time is lost in releasing and firmly resetting the pliers for each pulling stroke of the fish tape. Furthermore, it is often difficult to maintain the pushing and pulling rhythm, or the rhythm proceeds at a slow pace, when pliers are used.

Furthermore, electricians typically pull the fish tape with only the one hand which holds the pliers. Consequently, some electricians develop back problems due to repeatedly pulling the heavily loaded fish tape with one hand, because of the detrimental ergonomic position in which pulling occurs.

Although pliers are the predominant hand tool used for pulling electrical wire, other tools have been developed for the sole purpose of gripping or pulling fish tape. However, these tools suffer from one or more disadvantages which have precluded their widespread acceptance by electricians.

It is with regard to this background information that the improvements available for the present invention have evolved.

SUMMARY OF THE INVENTION

One of the significant aspects of the present invention is a hand tool for gripping an electrician's fish tape with both hands. The tool includes a first handle and a second handle pivotably connected at their inner ends. Enlarged head portions located at the inner ends of the handles have overlapping flat surfaces that allow a connection means to pivotably connect the first and second head portions together. A metal jaw is connected to each head portion so that the jaws face one another and are almost parallel to one another when the handles are in a nearly closed position substantially parallel to one another. In this position, the distance between the first and second jaws is slightly greater than the width of the fish tape. Thus, in the nearly closed position the jaws form a groove that allows for the insertion of a segment of the fish tape between the jaws. Once the fish tape is positioned within the groove, the handles may be pivoted to a closed gripping position with the jaws parallel to one another and are tightened about the fish tape. The handles thus remain in the closed gripping position as the electrician pulls on the handles during a typical pulling stroke. At the completion of the pulling stroke, the handles may be pivoted to an open position to release the grip on the fish tape. As the handles pivot toward the open position, and the second jaw moves away from the first jaw, an angled surface adjacent the second jaw on the second head portion pivots toward the first jaw. A channel formed between the first jaw and the angled surface on the second head portion is wider than the groove formed between the opposing jaws, thereby allowing the fish tape to move freely within the channel when the handles are in an open position. Furthermore, the channel may be closed by a cover plate that is positioned on the second head portion and pivots over top of the first jaw when the handles are pivoted to an open position. In this manner, the fish tape may be maintained within the closed channel as the tool is pushed forward along the tape in preparation for the next pulling stroke. Upon reaching the starting point of the next pulling stroke, the handles need only be pivoted to the closed gripping position to again secure the fish tape between the parallel jaws.

Another of the significant aspects of the present invention is a method of pulling an electrician's fish tape with two hands. The method involves steps including positioning a segment of the fish tape between opposing jaws attached to separate handles on a wire pulling tool and grasping one handle in each hand so that the handles are almost parallel to one another and the fish tape passes between the two hands. The handles are then pivoted slightly to a closed gripping position to place the two jaws in parallel relation to one another and to tighten the grip of the jaws on the fish tape. The fish tape may then be pulled or pushed, as required, by applying an equal force to both of the handles. Thus, due to the balanced, ergonomically correct manner in which the fish tape is pulled, an electrician may pull large amounts of wire without the accompanying back-strain associated with one-handed pulling tools. Additionally, the method may include the further steps of confining the fish tape within a closed channel upon pivoting the handles to an open position at the conclusion of each pulling stroke, and then pushing the handles forward along the fish tape in preparation for the next pulling stroke. Since the fish tape remains within the closed channel during the pushing step, the transition between the open position and the closed gripping position can be quickly accomplished upon reaching the starting point for the next pulling stroke.

Thus, one object of the present invention is to provide a tool and a method that allows an electrician to use two hands to pull wire in a balanced, ergonomically correct manner. A further object of the present invention is to provide a tool and a method for pulling wire in a quick and efficient manner by maintaining the tool in contact with the fish tape between individual pulling strokes.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a generalized perspective view with a portion broken away showing a fish tape gripping tool of the present invention being used by a person pulling fish tape from a wall conduit.

FIG. 2 is an enlarged perspective view of the tool shown in FIG. 1, with phantom lines illustrating a user's hands holding the tool while it grips the fish tape during a pulling stroke.

FIG. 3 is a perspective view similar to FIG. 2 showing two handles of the tool pivoted to release the grip on the fish tape when moving the tool to a position for another pulling stroke, and also showing the fish tape loosely held within a channel formed when the handles of the tool are pivoted.

FIG. 4 is an enlarged, partial top view of the tool shown in FIG. 2.

FIG. 5 is a partial side elevational view of the tool shown in FIG. 4.

FIG. 6 is a partial bottom view of the tool shown in FIG. 4.

FIG. 7 is a section view of the tool taken substantially in the plane of line 7—7 in FIG. 4.

FIG. 8 is an enlarged partial section view of the tool taken substantially in the plane of line 8—8 in FIG. 4.

FIG. 9 is an enlarged, partial section view of the tool taken substantially in the plane of line 9—9 in FIG. 5.

FIG. 10 is an enlarged, partial top view of the tool in the orientation shown in FIG. 3, with a portion broken out for clarity.

FIG. 11 is a partial section view of the tool taken substantially in the plane of line 11—11 in FIG. 10, illustrating the fish tape loosely held within a channel formed by pivoting the handles of the tool.

FIG. 12 is an enlarged, partial exploded view of the tool shown in FIG. 2.

DETAILED DESCRIPTION

A hand tool 20 incorporating the present invention and used for gripping an electrician's fish tape 22 is shown in FIGS. 1–3. The tool 20 grips the fish tape 22 when an electrician 24 uses both hands to firmly pull back on handles 26 and 28 of the tool 20, as shown in FIGS. 1 and 2. The pulling motion of the electrician 24 and the gripping action of the tool 20 pulls the fish tape 22 through a conduit 30 connected at one end to an electrical box 31, for example. The two handles 26 and 28 are pivotably connected together, and the pulling force pivots the handles 26 and 28 to tighten the grip on the fish tape 22 so the tape can be pulled by the electrician 24.

After a pulling stroke, the handles 26 and 28 are pivoted forward to an open position as shown in FIG. 3. Pivoting to the open position releases the grip on the fish tape 22, allowing the tool 20 to be pushed forward along the fish tape to a new location in preparation for the start of the next pulling stroke. When in the open position, a closed channel 32 preferably captures the fish tape 22 to prevent the tool 20 from disconnecting from the fish tape 22. The closed channel 32 is formed when the handles 26 and 28 are pivoted forward to the open position as shown in FIGS. 3, 11 and 12. Upon reaching the starting point of the next pulling stroke, the electrician 24 pivots the handles 26 and 28 backwards to a closed gripping position to firmly grip the fish tape 22 so it can again be pulled.

By confining the fish tape 22 within the closed channel 32 between pulling strokes, the electrician 24 can develop a smooth, rhythmic pattern of strokes which would be interrupted only if the tool 20 became disconnected with the fish tape 22. As a result, the electrician 24 achieves improved wire-pulling efficiency when working with a second person feeding electrical wires (not shown) into the conduit 30, obtains greater pulling force, and pulls from a more ergonomically correct position, among other things.

Prior to pulling the electrical wires through the conduit 30, a length of the fish tape 22 must initially be pushed through the conduit 30 so that a free end (not shown) of the tape may be connected to the electrical wires at an end of the conduit 30 opposite the outlet box 31. The tool 20 may also be used for pushing the fish tape 22 by simply inverting the tool so that the pushing force tends to pivot the handles to the closed gripping position and tighten the tool's grip on the tape. However, since more force is typically required for pulling the fish tape 22 and the attached wires, the tool 20 will be described predominantly with respect to pulling the fish tape.

The tool 20 is initially attached to the fish tape 22 by laterally positioning the fish tape in an elongated groove 34 formed when the tool is in an almost closed position with the handles 26 and 28 almost parallel to and in line with one another, as shown in FIG. 5. In this position the tool 20 is readily attached to the fish tape 22 at any point along its length. Once positioned within the groove 34, the grip on the fish tape 22 is tightened by pivoting the handles 26 and 28 slightly further into a completely closed gripping position, as shown in FIGS. 2 and 10. The pulling force exerted by the electrician naturally tends to pivot the handles 26 and 28 toward the closed gripping position, thereby allowing the electrician 24 to both grip and pull the fish tape in the same pulling motion.

The handles 26 and 28 of the tool 20 are pivotably connected together at their inner ends. An inner end of the handle 26 forms an enlarged head portion 36 which is in parallel flat contact with an enlarged inner head portion 38 of the handle 28. The head portions 36 and 38 overlap one another and are held in position by a pivot pin 40 as shown in FIG. 4. A shank 42 of the pivot pin 40 extends through apertures 44 formed in the head portions 36 and 38, while separate bushings 46 and 47 fit within the apertures 44 of the respective head portions 36 and 38 and surround the shank 42.

The pin 40 and bushings 46 and 47 are held in position by an enlarged head 48 at one end of the shank 42 and a snap ring 50 which fits within a groove 52 formed in the other end of the shank 42 opposite the enlarged head 48. The snap ring 50 compresses a thrust washer 54 against the head portion 38, while a similar thrust washer 55 is compressed between the enlarged head 48 of the pin 40 and the head portion 36. The thrust washers 54 and 55 maintain the flat surfaces of the enlarged head portions 36 and 38 generally in contact with one another during the pivoting motion of the handles 26 and 28. While the thrust washers 54 and 55 exert sufficient force to prevent the handles 26 and 28 from binding, they do not create excessive frictional force between the head portions 36 and 38 which would hinder relative movement of the handles 26 and 28.

A pair of metal gripping jaws 56 and 58 are attached to the head portions 36 and 38 of the handles 26 and 28, respectively. The jaw 56 is attached to the head portion 36 by a cover plate 60 fixed to the flat upper surface of the head portion 36 as shown in FIG. 4. The shank 42 of the pin 40 passes through an aperture 61 on the cover plate 60, the aperture 61 being smaller than the apertures 44 to prevent the bushings 46 and 47 from withdrawing from the apertures 44 in the vertically upward direction as shown in FIG. 4. The cover plate 60 is held in position on the head portion 36 by the enlarged head 48 of the pin 40 and the thrust washer 55. Additionally, a pair of extended edges 62 and 64 on the sides of the cover plate 60 contact side surfaces 66 and 68 of the head 36, respectively, as shown in FIG. 4. Contact between the extended edges 62 and 64 and the side surfaces 66 and 68, in conjunction with the force exerted by the enlarged head 48 of the pin 40, cause the cover plate 60 to maintain a stationary position on the head portion 36.

The jaw 56 is attached to the cover plate 60 by a pair of screws 70 which extend through apertures 72 in the cover plate 60 and into threaded holes 74 in the jaw 56. The jaw 56 includes a laterally outward facing flat surface 76 which contacts a correspondingly shaped flat inner surface 78 of the enlarged head portion 36. Additionally, a flat side surface 80 of the jaw 56 contacts the extended edge 64 of the cover plate 60 as shown in FIG. 4. Attached to the head portion 36 in this manner, the jaw 56 is rigidly retained in an operative position for effectively gripping the fish tape 22.

The other jaw 58 is rigidly attached directly to the head portion 38 by screws 82 which extend through the head portion 38 and into threaded holes 84 in the jaw 58, as shown in FIG. 4.

With the jaws 56 and 58 connected to the respective head portions 36 and 38 in the manner described, serrations 86 and 88 of the jaws 56 and 58, respectively, face one another in an almost parallel fashion across the groove 34 when the handles 26 and 28 are in the almost closed position. Due to the position of the serrations 86 and 88 on the jaws 56 and 58, as shown in FIGS. 4, 5 and 10, the distance between the serrations 86 and 88 will decrease as the handles 26 and 28 are closed further. Once the handles are pivoted into the closed gripping position, the serrations 86 and 88 will be parallel to one another to operatively grip the fish tape 22 as shown in FIGS. 2 and 10. The pulling force applied to the tool 20 maintains the handles 26 and 28 in the closed gripping position while increasing the force applied by the serrations 86 and 88 against the side of the fish tape 22 to more firmly grip the tape during a pulling stroke. When the handles 26 and 28 are pivoted slightly forward from the closed gripping position, the parallel serrations 86 and 88 separate slightly to release the grip on the fish tape 22 and provide an opportunity for removal of the fish tape from the groove 34.

A side surface 90 of the jaw 56 opposite the flat side surface 80 is angled to converge forwardly and outwardly toward the surface 76, forming a predetermined acute angle with the outward facing flat surface 76 of the jaw 56. The angled side surface 90 of the jaw 56 extends co-planarly with an angled corner surface 92 of the head portion 36. Thus, when the handles 26 and 28 are pivoted to the closed position as shown in FIG. 5, the angled surfaces 90 and 92 extend toward an inner surface 94 of the jaw 58 at the predetermined acute angle. When the handles 26 and 28 are pivoted to the open position so that the serrations 86 and 88 separate from one another, the angled surfaces 90 and 92 pivot toward the inner surface 94 of the jaw 58, as shown in FIGS. 3 and 11. However, the distance between the inner surface 94 and the angled surfaces 90 and 92 is greater than the width dimension of the groove 34 when the handles 26 and 28 are in the closed position. Thus, the fish tape 22 is freely moveable between the inner surface 94 and the angled surfaces 90 and 92 when the handles are in an open position.

Upon pivoting the handles 26 and 28 to the open position, an inner corner portion 96 of the cover plate 60 moves laterally over a top surface of a portion of the jaw 58 to form the closed channel 32, as shown in FIGS. 3, 11 and 12. Thus, the angled surfaces 90 and 92, in conjunction with the inner surface 94 of the jaw 58 and the corner 96 of the cover plate 60, enclose the closed channel 32. Thus, in an open position, the fish tape 22 can be easily moved within the closed channel 32.

The closed channel 32 offers the advantage of allowing the electrician 24 to move the tool 20 quickly and easily forward for the next pulling stroke. The closed channel 32 captures the fish tape 22 to prevent the tool 20 from disconnecting or disassociating with the fish tape. Once the electrician 24 has pushed the tool 20 sufficiently forward to commence the next stroke, a slight pivoting motion moves the handles 26 and 28 from the open position to the closed gripping position to grip the fish tape 22 between the parallel serrations 86 and 88 of the jaws 56 and 58, respectively, and allow the commencement of the next pulling stroke.

The maximum pivoted position of the handles 26 and 28 in the open position is limited by contact of the head portion 38 with a corner of the handle 26. The handles 26 and 28 are each preferably constructed from two laminated metal pieces 98 and 100, and 102 and 104, respectively, such as aluminum. The handle pieces are joined by countersunk rivets 106 as shown in FIG. 4. The top piece 98 of the handle 26 includes the enlarged head portion 36, while the bottom piece 104 of the handle 28 includes the enlarged head portion 38. Due to the overlapping nature of the head portions 36 and 38, the head portion 38 is coplanar with the bottom piece 100 of the handle 26. Contact between an innermost surface 108 of the head portion 38 and an inner corner 110 of the bottom piece 100 defines a maximum opening pivot angle relative to the handles 26 and 28.

Preferably, the dimensions of the head portion 38 and the bottom piece 100 are fixed so that the maximum opening angle is substantially equal to the predetermined acute angle formed by the angled surfaces 90 and 92. In this manner, upon pivoting the handles 26 and 28 through the maximum opening angle, the angled surfaces 90 and 92 will be substantially parallel to the flat inner surface 94 of the jaw 58, thereby providing the closed channel 32 with a substantially uniform rectangular cross section, as shown in FIG. 12. In the preferred embodiment, both the maximum opening angle and the predetermined acute angle are approximately 25 degrees.

FIGS. 1, 2 and 5–10 illustrate the tool 20 gripping a segment of fish tape 22. The fish tape 22 is made from a resilient spring steel material and has a substantially rectangular cross-section, as shown in FIGS. 9 and 12. To initially grip a segment of the fish tape 22, the tool 20 must first be placed in an almost closed position as shown in FIG. 5. The fish tape 22 is then inserted within the groove 34 between the serrations 86 and 88. The handles 26 and 28 are then pivoted to the closed gripping position and the serrations 86 and 88 tightened about the fish tape 22. Once gripped between the serrations 86 and 88, the fish tape 22 may be pushed or pulled by the electrician 24 as shown in FIGS. 1 and 2.

Following the completion of each pulling stroke, the electrician 24 pivots the handles 26 and 28 to an open position and slides the tool 20 along the fish tape 22 until a desired point on the tape 22 is reached for the start of a new pulling stroke. Upon pivoting the handles 26 and 28 to an open position, regardless of whether the handles are pivoted through the maximum opening angle, the fish tape 22 remains confined within the closed channel 32, as shown in FIGS. 3, 11 and 12. Thus, upon reaching the desired starting point for the new pulling stroke, the handles 26 and 28 may be quickly pivoted from the open position to the closed gripping position, thereby gripping the fish tape 22 between the parallel serrations 86 and 88 without having to manually reinsert the fish tape 22 within the groove 34. In this manner, any number of pulling strokes may be performed without interruption. This aspect of the tool 20 allows the electrician pulling the fish tape 22 to increase his or her efficiency by eliminating the need for continually releasing and regripping the fish tape, as is required by many prior art hand tools. Furthermore, constant contact between the tool 20 and the fish tape 22, and the provision of a maximum opening angle, enable the electrician 24 to work quickly and consistently, and thereby establish a rapid pulling rhythm in concert with a second electrician feeding wires into an opposite end of the conduit 30.

The use of the laminated pieces 98, 100, 102 and 104 allows the separate pieces 98 and 104 containing the respective head portions 36 and 38 to be formed separately from the pieces 100 and 102, thereby providing a savings in manufacturing costs. Additionally, by preventing slack between the head portions 36 and 38 during the cyclical pivoting of the handles 26 and 28, the thrust washers 54 and 55 reduce wear of the aluminum head portions 36 and 38. Furthermore, the preferably brass or steel bushings 46 and 47 surrounding the shank 42 of the preferably steel pivot pin 40 further reduce wear of the respective aluminum head portions 36 and 38 along the apertures 44, thereby extending the useful life of the tool 20.

The metal jaws 56 and 58 are preferably annealed so that the serrations 86 and 88 are softer than the spring steel fish tape 22. In this manner, the jaws 56 and 58 are unlikely to damage the reusable fish tape 22, even after numerous wire pulls. Rather than damaging the fish tape, the jaws 56 and 58 will slowly wear down with use until they require replacement. However, the replacement costs of the jaws 56 and 58 are minimal. Furthermore, the jaws are easily replaced, requiring the removal of only two screws each. Thus, the use of annealed metal jaws 56 and 58 serves to increase the useful life of the fish tape 22.

Additionally, the two-hand design of the tool 20 allows an electrician to apply an equal force on each handle 26 and 28 when pulling wire. Regardless of whether the electrician is pulling or pushing fish tape from above or below, he or she must apply an equal force with each arm in order to properly use the tool 20. Indeed, it is not possible to use the tool 20 in an unbalanced manner. Thus, the two handles 26 and 28 require the electrician 24 to utilize proper ergonomic form, thereby reducing or preventing backstrain caused by pulling wire with pliers or other one-handed tools. Furthermore, foam handle grips 112 are preferably used to cover the handles 26 and 28, thereby enhancing the user's comfort while pulling wire. The foam grips 112, in combination with the ergonomically correct two-hand design of the tool 20, allow an electrician to pull great lengths of wire without suffering the added discomfort inherent in many prior art hand tools.

A presently preferred embodiment of the present invention and many of its improvements have been described with a degree of particularity. This description has been made by way of preferred example and is based on a present understanding of knowledge available regarding the invention. It should be understood, however, that the scope of the present invention is defined by following claims, and not necessarily by the detailed description of the preferred embodiment.

The invention claimed is:

1. A hand tool for gripping an electrician's fish tape with both hands, comprising:

a first handle having a first head at an inner end thereof, said first head having a top surface, a bottom surface and an inner end;

a second handle having a second head at an inner end thereof, said second head having a top surface, a bottom surface and an inner end;

a first jaw connected to the top surface of the first head adjacent the junction of the first head and the first handle;

a second jaw connected to the inner end of the second head opposite the junction of the second head and second handle;

means for pivotably connecting the top surface of the first head to the overlapping bottom surface of the second head, to allow the first and second handles to pivot to an almost closed position in which the first and second jaws face one another in an almost parallel fashion to form an open groove therebetween, the groove having a width dimension sufficient to insert the fish tape between the two jaws, the pivotable connecting means also allowing the first and second handles to pivot to a closed gripping position in which the first and second jaws are substantially parallel to one another and the fish tape is gripped therebetween, and to pivot through an opening angle to an open position in which the two jaws are separated from one another to release the fish tape, said opening angle being no greater than a predetermined maximum opening angle; and the inner end of the second head further comprising:

a straight surface which maintains the second jaw substantially parallel to the first jaw when the first and second handles are in the closed gripping position; and an angled surface forming a predetermined acute angle with the first jaw when the first and second handles are in the closed gripping position, the distance between the angled surface and the first jaw being greater than the width dimension of the groove when the first and second handles are in the almost closed position.

2. A hand tool as described in claim 1, wherein the distance between the angled surface and the first jaw is greater than the width dimension of the groove when the first and second handles are pivoted to an open position.

3. A hand tool as described in claim 2, further comprising:

a cover plate connected to the top surface of the second head, said cover plate having an inner corner portion that overlies the first jaw to form a closed channel with the first jaw, the top surface of the first head and the inner end of the second head when the first and second handles are pivoted to an open position, said closed channel adapted to loosely retain the fish tape therein.

4. A hand tool as described in claim 3, wherein the predetermined maximum opening angle is defined by contact between the second handle and the inner end of the first head.

5. A hand tool as described in claim 4, wherein the maximum opening angle is substantially equal to the predetermined acute angle, and the angled surface is substantially parallel to the first jaw when the first and second handles have been pivoted through the maximum opening angle.

6. A hand tool as described in claim 5, wherein the closed channel further comprises the angled surface, and wherein:

the closed channel has a substantially uniform cross section when the first and second handles have been pivoted through the maximum opening angle.

7. A hand tool as described in claim 1, wherein the first jaw comprises a first metal block having serrations thereon, said first metal block being releasably attached to the top surface of the first head by removable metal fasteners.

8. A hand tool as described in claim 7, wherein the second jaw comprises a second metal block having serrations thereon, said second metal block connected to the straight surface of the inner end of the second head.

9. A hand tool as described in claim 3, wherein the second jaw is releasably attached to the cover plate by removable metal fasteners.

10. A hand tool as described in claim 8, wherein the first and second metal blocks are annealed to make the serrations of the first and second jaws softer than the fish tape.

11. A hand tool as described in claim 6, wherein the first and second handles are further comprised of top and bottom laminated pieces, the first head being formed at an inner end of the bottom piece of the first handle and the second head being formed at an inner end of the top piece of the second handle.

12. A hand tool as described in claim 11, wherein the maximum opening angle is further defined by contact between the bottom piece of the second handle and the inner end of the first head.

13. A hand tool as described in claim 12, wherein the maximum opening angle is approximately 20 degrees.

* * * * *